(12) United States Patent
White

(10) Patent No.: US 9,456,714 B2
(45) Date of Patent: Oct. 4, 2016

(54) KETTLE WITH LID DAMPING MECHANISM

(75) Inventor: Gerard White, Alexandria (AU)

(73) Assignee: BREVILLE PTY LTD, Alexandria, New South Wales ( * ) Notice: Subject to any disclaimer, the term of this patent is extended or adjusted under 35 U.S.C. 154(b) by 1594 days.

(21) Appl. No.: 11/104,473

(22) Filed: Apr. 13, 2005

(65) Prior Publication Data

US 2005/0229788 A1    Oct. 20, 2005

(30) Foreign Application Priority Data

Apr. 19, 2004  (AU) ................................. 2004902070

(51) Int. Cl.
| | | |
|---|---|---|
| A47J 31/00 | (2006.01) | |
| A47J 27/21 | (2006.01) | |
| A47J 36/10 | (2006.01) | |

(52) U.S. Cl.
CPC ........... *A47J 27/21175* (2013.01); *A47J 31/00* (2013.01); *A47J 36/10* (2013.01)

(58) Field of Classification Search
CPC .... A47J 27/21; A47J 27/21175; A47J 31/00; A47J 36/00; A47J 36/06; A47J 36/10
USPC ........................ 220/830, 827, 264, 845, 756; 222/470–473, 465.1, 556, 475.1; 16/54; 49/386; 99/323.3
See application file for complete search history.

(56) References Cited

U.S. PATENT DOCUMENTS

| | | | |
|---|---|---|---|
| 4,403,711 A * | 9/1983 | Kyosuke | 220/731 |
| 5,582,316 A * | 12/1996 | Masayoshi et al. | 220/264 |
| 6,172,341 B1 * | 1/2001 | Hoffmann et al. | 219/441 |
| 6,540,120 B2 * | 4/2003 | Lebowitz | 222/471 |
| 6,786,353 B2 * | 9/2004 | Gourand | 220/835 |
| 7,065,834 B2 * | 6/2006 | Lowry | 16/330 |
| 7,299,955 B2 * | 11/2007 | Pelkey et al. | 222/465.1 |
| 2002/0038804 A1 | 4/2002 | Gourand | |
| 2003/0201265 A1* | 10/2003 | Lin | 220/254.3 |
| 2004/0178710 A1* | 9/2004 | Kim et al. | 312/405 |

FOREIGN PATENT DOCUMENTS

| | | | |
|---|---|---|---|
| EP | 1061224 A1 | | 12/2000 |
| EP | 1161911 A1 | * | 12/2001 |
| JP | 402224708 A | * | 9/1990 |
| JP | 7313371 A | | 12/1995 |
| JP | 2001037830 A | | 2/2001 |

* cited by examiner

*Primary Examiner* — Andrew Perreault
(74) *Attorney, Agent, or Firm* — Michael Molins

(57) ABSTRACT

A vessel has a hinged lid. The hinged lid is biased into an open position by a spring. The lid is mechanically coupled to a damping mechanism, preferably concealed within the body or lid of the vessel. The lid is held in a closed position by a latch.

14 Claims, 5 Drawing Sheets

KETTLE WITH LID DAMPING MECHANISM

FIELD OF THE INVENTION

The invention pertains to dampened lids and more particularly to a dispenser such as a kettle with a lid damping mechanism.

BACKGROUND OF THE INVENTION

Fillable dispensers such as electric kettles are well known. Most kettles have either hinged lids or removable lids. A kettle with a hinged lid must generally be operated with two hands, one hand to hold the handle of the kettle and a second hand to open the lid. It would be advantageous to provide a kettle having a lid that could be opened with one hand rather than two. One way of solving this problem would be to provide a spring-operated lid that is biased into an open position. However, release of a spring-biased lid would cause the lid to open in a rapid and abrupt fashion. This has the potential to eject hot water from the underside of the lid. Steam may condense on the underside of the lid to create droplets of hot water. It will be appreciated that the teachings of the present invention may be applied to a variety of vessels with lids.

OBJECTS AND SUMMARY OF THE INVENTION

It is an object of the invention to provide a vessel with a lid damping mechanism.

It is also an object of the invention to provide a vessel that can be operated with one hand.

It is also an object of the invention to provide a kettle that is esthetically pleasing and easy to use.

Accordingly, there is provided a vessel with a hinged lid. The hinged lid is biased into an open position by a spring. The lid is mechanically coupled to a damping mechanism that is affixed to the body of the vessel. The lid is preferably held in a closed position by a latch.

BRIEF DESCRIPTION OF THE DRAWING FIGURES

BEST MODE AND OTHER EMBODIMENTS OF THE INVENTION

Figure 1:
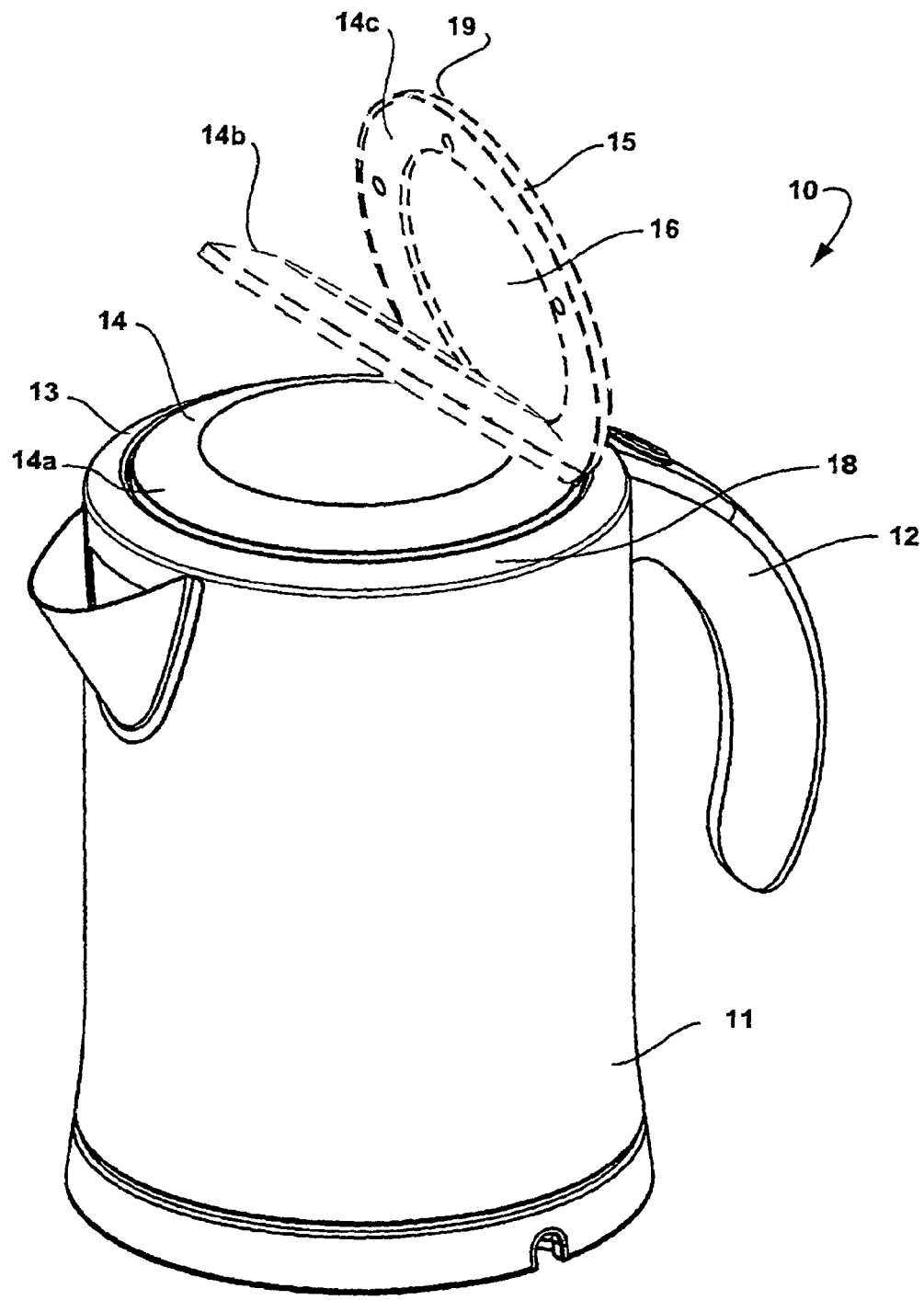
FIG. 1 is a perspective view of a kettle in accordance with the teachings of the present invention.

As shown in FIG. 1 a vessel, being an electric kettle 10, comprises a body 11 with a handle 12. In this example, the body 11 is generally cylindrical and has at an upper extremity, a round main opening 13. The main opening 13 is fully covered by a generally flush lid 14. In this drawing figure, the lid is shown in a closed position 14a, an intermediate position 14b and a fully open position 14c. Note that the lid comprises a peripheral rim 15 with a transparent central portion 16. A knob is not required on the lid 14. The upper extent 18 of the body 11 forms an uninterrupted width or flange. The top surface of the outer rim 19 of the lid 14, when it is closed, is essentially flush with the inner edge of the flange. A narrow gap exists between the lid and the flange.

Figure 2:
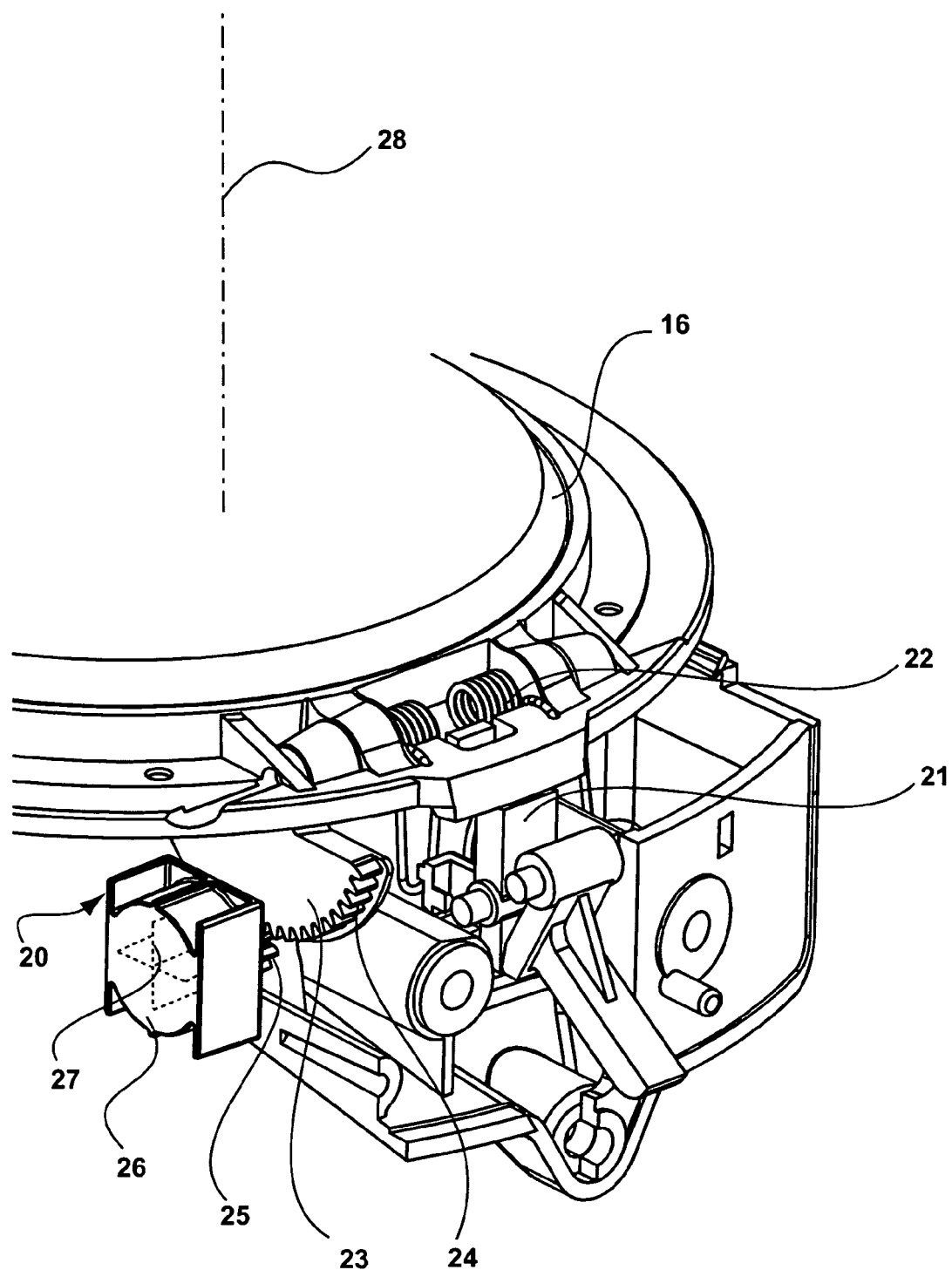
FIG. 2 is a perspective view of a damping mechanism, spring and latch in accordance with the teachings of the present invention.

As shown in FIG. 2, the area of the body 11 adjacent to the handle 12 conceals a damping mechanism 20, a latch mechanism 21 and a resilient bias being in this example, a torsion spring 22 that is concealed within the lid. The torsion spring 22 is carried on a rotational axis between the lid 14 and the body 11. The spring or springs 22 bias the lid 14 into an open position. The spring 22 is torsionally loaded when the lid 14 is closed.

Figure 3:
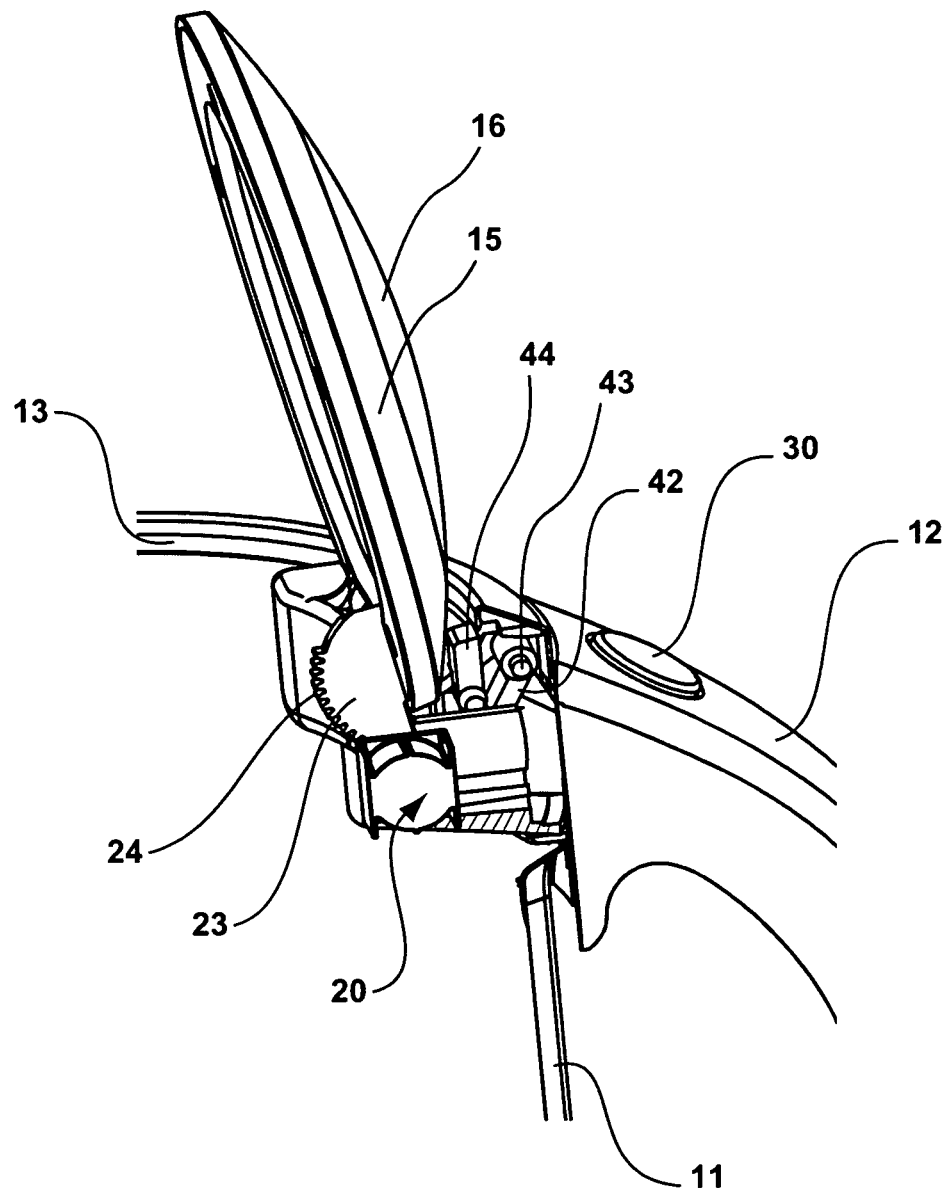
FIG. 3 is a perspective view, partially sectioned, of a lid and damping mechanism of the type depicted in FIGS. 1 and 2.

As shown in FIGS. 2 and 3, the underside of the lid 14 has rigidly attached to it a section of a gear 23 with external teeth 24 which describe an arc of a circle. The circle suggested by the teeth 24 has a center (not shown). This center defines the rotational axis of the lid. For optimized opening geometry, the center is located somewhere between the longitudinal centerline 28 of he vessel and the exterior surface of the vessel. In this example, the gear teeth 24 mesh with a pinion gear 25 that is carried by a rotating damping mechanism 20 that is carried by the body. As illustrated, the damping mechanism 20 comprises a sealed cavity 26 that contains an impeller 27 packed in grease such as a food grade silicone based grease. Food grade grease is required because the damping mechanism is actually located within the inner wall of the vessel and is therefore exposed to steam and the contents of the vessel. In this particular embodiment, the impeller has four radially extending blades. Other types of damping mechanisms are known, such as those based on concentric cylinders with grease between them. Note from the depiction in FIG. 3, that the lowest edge of the open lid is within and also below the rim of the main opening 13. This ensures that fluid dripping off of the lid is caught within the body of the vessel or kettle. This favorable lid opening geometry results from the location of the rotational axis of the lid. The rotational axis is radially inward of the gap between the lid and the body (in particular, nearest the hinge or lid rotational axis). In other words, the rotational axis of the lid is located between that gap and the longitudinal centerline 28 of the body 11. The longitudinal axis can be thought of as the central vertical axis of a resting kettle. These terms are used with reference to present examples that show a round kettle. It is considered appropriate to refer to these same vertical axes and centerlines, in perhaps a looser sense, even when the body of the vessel or kettle is not round or symmetrical.

Figure 4:
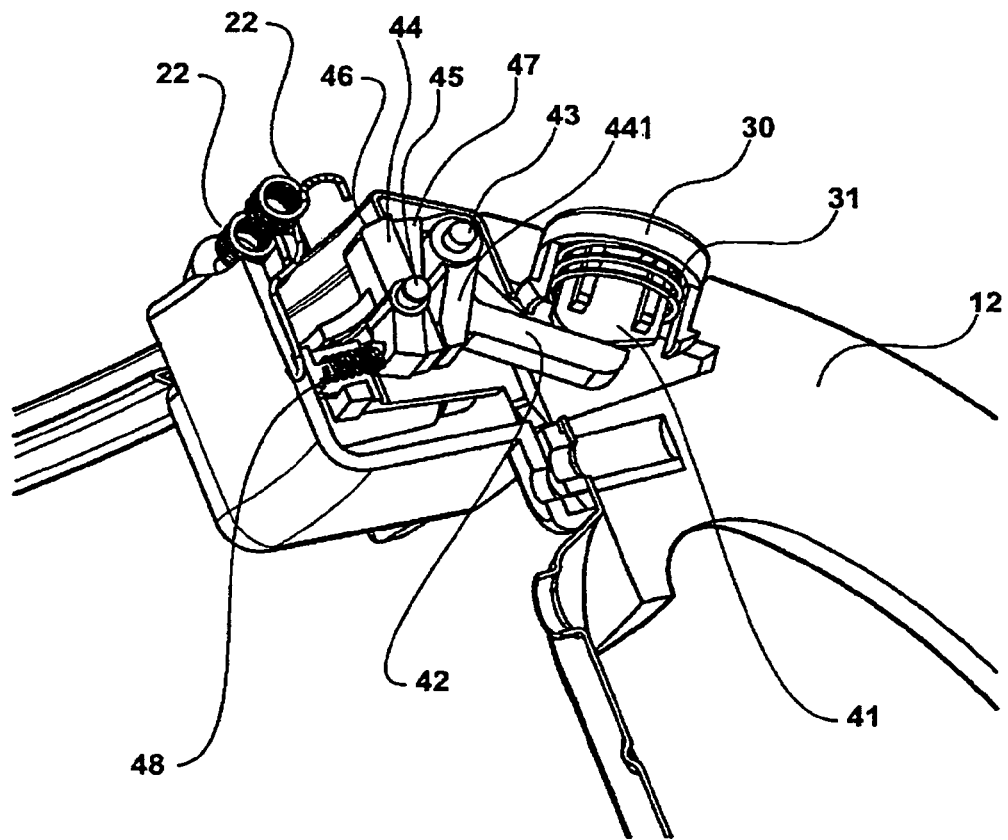
FIG. 4 is another perspective view of a damping mechanism.

As shown in FIGS. 2, 3 and 4, the latching mechanism comprises a button 30 mounted on the handle 12. Having the activating button on or near the handle allows for one-handed operation of the opening of the lid. When the button 30 is depressed it acts against a compression spring 31. A rounded projection or cam 41 affixed to an underside of the button 30 acts on toggle 42. The toggle is suspended below a horizontal axle 43 so that depressing the button 30 causes a forward end 441 of the toggle 42 to contact and displace a lower end of a pivoting latch 44. As shown in FIG. 4, the action of the toggle against the lower portion of the latch 44 causes the latch to rotate about its pivot points 45. This causes an upper end of the latch 44 to rotate or retract from an engaged position 46 to a disengaged position 47. In the engaged position, the underside of the lid 14 interferes with the top of the latch and the lid is therefore unable to open.

In the disengaged position 47 the latch no longer interferes with the lid and the torsional force imposed by the springs 22 is sufficient to raise the lid 14. The latch is automatically returned to the engaged position by a compression spring 48.

As the lid opens under the influence of the springs 22, the rotation of the gear section 23 is resisted by the damper 20. The damper effectively reduces both the acceleration and the velocity of the opening lid so that droplets or condensate are not ejected from the underside of the lid.

After the lid is fully opened (as shown in FIG. 3) it may be returned to the closed and latched position simply by exerting finger pressure on the outside of the lid. In this way, the top surface of the kettle, but for the button 30, is unencumbered by external latches, buttons, knobs or other features that detract from the aesthetic and hygienic values that are delivered by the improvements of the present invention.

Figure 5:
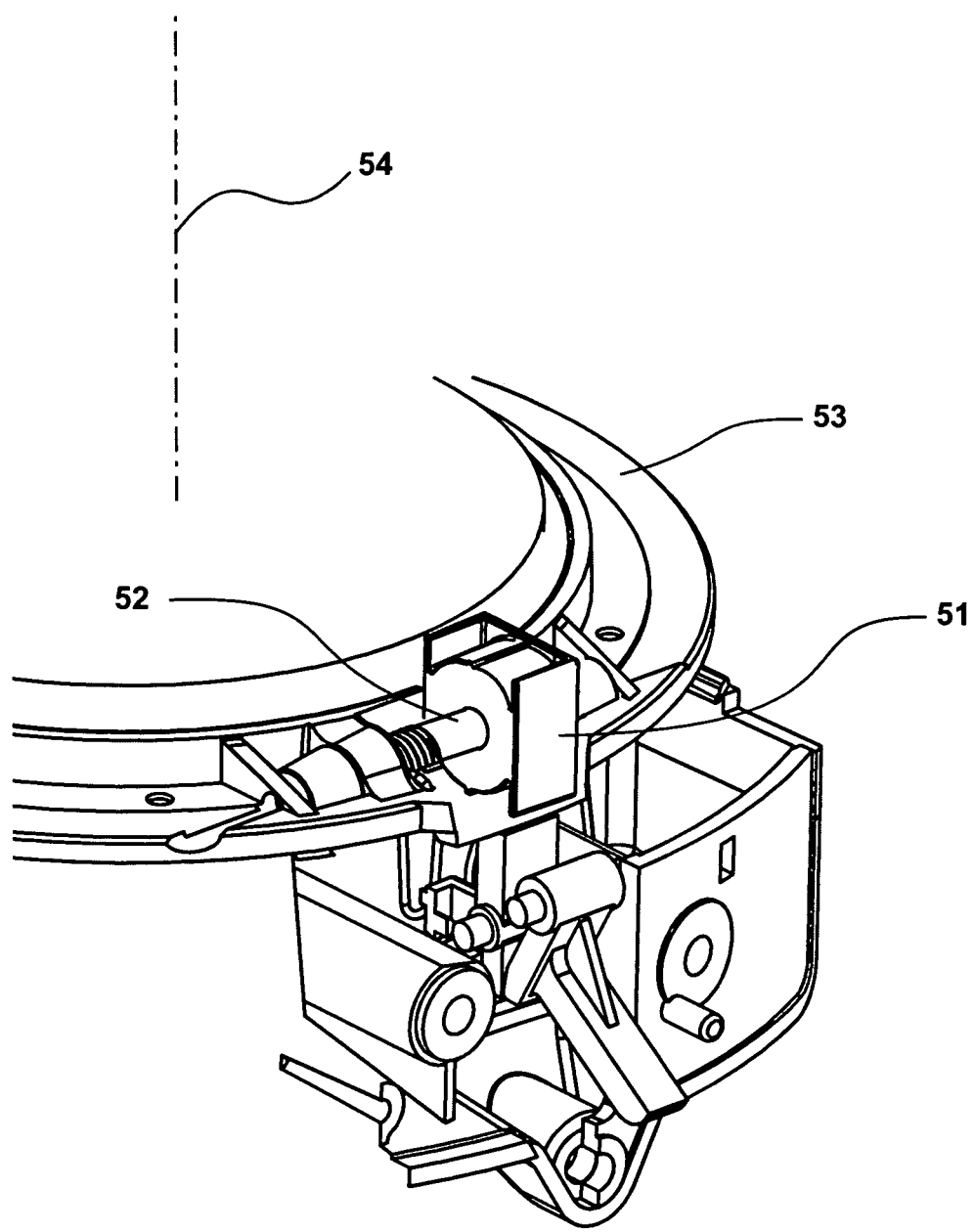
FIG. 5 is a perspective view of an alternate damping mechanism arrangement.

An alternate embodiment is depicted in FIG. 5. In this example, the damping mechanism 51 is co-axial with the rotational axis of the lid 53 (partially shown). A shaft or pin 52 is attached to the lid, rotates with the lid and extends along this axis. In some examples the shaft carries impeller blades, as above. The outer body of the damping mechanism is attached to the vessel's body (not shown). Thus, the damping mechanism is concealed within the upper and lower shell components of the lid. As with the previous example, the axis of rotation of the lid is located "forward" of the lid-body gap, that is, between the gap and the longitudinal centerline of the body 54.

While the present invention has been disclosed with reference to particular details of construction, these should be considered as having been provided by way of example and not as limitations to the scope or spirit of the invention. In particular, the precise type of damping mechanism, latching mechanism and spring mechanism are considered as having been provided by way of example.

What is claimed is:

1. An electric kettle having a hinged lid, comprising:
a latching mechanism for securing the lid when the lid is closed and for releasing the lid;
an actuator that releases the lid being located on a handle of the vessel;
a resilient bias member acting on the lid to open the lid when the actuator releases the lid;
a damping mechanism acting on the lid as the lid open;
the damping mechanism further comprising a part that rotates with opening of the lid and which is mounted for rotation within a cavity that contains a fluid for viscous resistance to such rotation.

2. An electric kettle according to claim 1, wherein:
a closing of the lid closes an upper opening of the vessel; and
a rotational hinge axis of the lid is located inwardly of a rim of the opening.

3. An electric kettle according to claim 2, wherein:
the hinge axis of the lid is located within a periphery of the lid.

4. An electric kettle according to claim 1, wherein:
the resilient bias member is provided by one or more torsion springs.

5. An electric kettle according to claim 1, wherein:
an outer edge of an upper surface of the lid, when closed, is substantially flush with a surrounding portion of the vessel.

6. An electric kettle according to claim 1, wherein:
the vessel is a kettle adapted to one handed operation and the activator is a button on a handle of the kettle that is depressed to release the latching mechanism.

7. An electric kettle according to claim 1, wherein:
the part of the damping mechanism that rotates comprises blades mounted for rotation within the cavity in response to an opening movement of the lid.

8. An electric kettle according to claim 1, wherein:
the cavity contains a food-grade fluid for viscous resistance to rotation.

9. An electric kettle according to claim 7, wherein:
the blades are driven to rotate owing to gearing that couples the blades to the lid.

10. An electric kettle according to claim 9, wherein:
the fluid is a food grade fluid.

11. An electric kettle according to claim 1, wherein:
the damping mechanism is located within a body of the kettle and is exposed to steam.

12. An electric kettle having a hinged lid that covers an opening, comprising:
a latching mechanism for securing the lid when the lid is closed and for releasing the lid;
an actuator that releases the lid being located on a handle of the vessel;
a resilient bias member acting on the lid to open the lid when the actuator releases the lid;
a damping mechanism acting on the lid as the lid opens;
a rotational hinge axis of the lid being located inwardly of a rim of the opening;
the kettle being adapted to one handed operation; and
the activator is a button on a handle of the kettle that is depressed to release the latching mechanism.

13. An electric kettle according to claim 12, wherein:
a part of the damping mechanism rotates within a cavity in response to an opening movement of the lid.

14. An electric kettle according to claim 13, wherein:
the cavity contains a food-grade fluid for viscous resistance to rotation.

* * * * *